(12) United States Patent
Kobayashi et al.

(10) Patent No.: US 6,302,133 B1
(45) Date of Patent: Oct. 16, 2001

(54) FUEL TANK

(75) Inventors: Makoto Kobayashi; Toshiaki Ichitani; Yoshihiro Shimizu; Takeshi Suzuki; Ryuji Fujino, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/690,020

(22) Filed: Oct. 17, 2000

(30) Foreign Application Priority Data

Nov. 15, 1999 (JP) ............................................. P 11-324231
Nov. 15, 1999 (JP) ............................................. P 11-324232

(51) Int. Cl.[7] ..................................................... G05D 13/04
(52) U.S. Cl. ........................... 137/43; 137/587; 137/588; 141/59; 141/198; 123/516
(58) Field of Search ..................................... 137/587, 585, 137/43; 141/59, 198; 123/516

(56) References Cited

U.S. PATENT DOCUMENTS 4,934,417 * 6/1990 Bucci ........................................ 141/1
5,040,575 * 8/1991 Oeffling et al. .......................... 141/44
5,056,494 * 10/1991 Kayanuma ............................. 123/519
5,730,194 * 3/1998 Foltz ...................................... 141/301
5,979,417 * 11/1999 Hyodo et al. .......................... 123/516

\* cited by examiner

*Primary Examiner*—A. Michael Chambers
*Assistant Examiner*—Thomas L. McShane
(74) *Attorney, Agent, or Firm*—Arent Fox Kintner Plotkin & Kahn, PLLC

(57) ABSTRACT

A fuel tank T has a seal member 18 provided at a fuel entry port 16 provided at an upper end of a filler pipe 12 extending continuously to a tank main body 11 for sealing the outer circumference of a nozzle of a fuel filling gun G. A first relief valve 27 and a second relief valve 29 which are adapted to open when the internal pressure of the filler pipe 12 reaches or exceeds a predetermined value are provided along a first relief passage 26 and a second relief passage 28, respectively, which continuously extend to the filler pipe 12. When excessive fuelling occurs, the first relief valve 27 is made to open so that fuel inside the filler pipe 12 is allowed to be discharged to the outside thereof, and the second relief valve 29 is made to open so that part of fuel inside the filler pipe 12 is allowed to flow out into the fuel entry port 16 located above the seal member so as to inform the operator of a fuel filling pump of the occurrence of an abnormal situation to thereby prompt him or her to stop fueling.

9 Claims, 3 Drawing Sheets

FUEL TANK

BACKGROUND OF THE INVENTION

1. Field of the Invention

The present invention relates to a fuel tank having a seal member provided at a fuel entry port provided at an upper end of a filler pipe continuously extending to a tank main body for sealing an outer circumference of a nozzle of a fuel filling gun adapted to be inserted into the fuel entry port, or a float valve adapted to close when the fuel level in the tank main body rises and when a vehicle rolls over.

2. Description of the Related Art

A fuel tank of an automobile has a fuel entry port provided at an upper end of a filler pipe extending upwardly from a tank main body, and the nozzle of a fuel filling gun is inserted into a seal member provided at the fuel entry port for refueling. When the fuel level of the tank main body is raised by refueling until the fuel tank becomes full, a float valve is closed to suppress the rise of the fuel level in the fuel tank, and therefore when refueling continues further, the fuel level of the filler pipe then rises. Then, when the nozzle of the fuel filling gun submerges under the fuel level of the filler pipe due to the rise of the latter, an automatic fill-stop device of the fuel filling gun is actuated to thereby prevent the excessive refueling.

In addition, when the fuel level in the tank main body rises due to fueling, vaporized fuel is pushed out into a charging passage from the tank main body through the float valve for adsorption by a canister, whereby the emission of vaporized fuel to the atmosphere is prevented. Moreover, when the fuel level in the filler pipe rises after the float valve closes in accordance with the rise of the fuel level in the tank main body, vaporized fuel pushed out from the filler pipe by the rising fuel is supplied to the canister via the breather pipe and the charging passage.

However, when the automatic fill-stop device fails for some reason to thereby cause an excessive refueling and the fuel level in the fuel filler pipe rises over the limit, since the fuel entry port at the upper end of the filler pipe is closed with the nozzle of the fuel filling gun inserted into the seal member, the internal pressures of the tank main body and the filler pipe rise as refueling continues, whereby the tank main body or the filler pipe may be deformed or the nozzle of the fuel filling gun may be dislocated from the seal member at the fuel entry port, leading to a leakage of fuel.

Further, when excessive fueling occurs due to the failure of an automatic fill-stop device of a fuel filling gun or carelessness of the operator of a fuel filling pump, there is a risk that fuel flows into the canister from the filler pipe after passing through the breather pipe and the charging passage. In addition, since the float valve closes when the vehicle rolls over, although there is no risk that fuel inside the tank main body directly flows into the canister through the charging passage, there is a possibility that fuel inside the tank main body flows into the canister after passing through the breather pipe and the charging passage from the filler pipe.

SUMMARY OF THE INVENTION

The present invention was made in view of the aforesaid conditions, and an object thereof is to prevent the deformation of the fuel tank or the outflow of fuel in the even that there occurs an excessive fueling in conjunction with the failure of the automatic fuel fill-stop device of the fuel filling gun, and another object thereof is to ensure that fuel inside the filler pipe is prevented from flowing into the canister through the breather pipe when fuel is supplied excessively or the vehicle rolls over.

With a view to attaining the above object, according to a first aspect of the invention, there is provided a fuel tank having a seal member provided at a fuel entry port provided at an upper end of a filler pipe continuously extending to a tank main body for sealing an outer circumference of a nozzle of a fuel filling gun adapted to be inserted into the fuel entry port, the fuel tank comprising; a first relief valve and a second relief valve which are adapted to open when the internal pressure of the filler pipe reaches or exceeds a predetermined value, wherein the first relief valve allows the interior of the filler pipe to communicate with the atmosphere, while the second relief valve allows the interior of the filler pipe to communicate with the fuel entry port located above the seal member.

According to the aforesaid construction, since there is provided the first relief valve adapted to open when the internal pressure of the filler pipe reaches or exceeds the predetermined value due to excessive fueling to thereby allow the interior of the filler pipe to communicate with the atmosphere, the internal pressure of the filler pipe can be reduced by opening the first relief valve when excessive fueling takes place. This obviates the necessity of imparting the tank main body and the filler pipe a strength which can withstand the excessive internal pressure and therefore contributes to the reduction in weight of the tank main body and the filler pipe. Moreover, the construction can prevent the outflow of the fuel resulting from the dislocation of the nozzle of the fuel filling gun from the seal member due to the excessive internal pressure. In addition, there is also provided the second relief valve adapted to open when the excessive fueling takes place to thereby allow part of fuel within the filler pipe to flow out into the fuel entry port located above the seal member, the operator of the fuel filling pump can be informed of the occurrence of an abnormal situation to thereby prompt him or her to stop fueling.

Further, according to a second aspect of the invention, there is proposed a fuel tank wherein an upper space of tank main body is connected to a canister via a charging passage, wherein an upper space of a filler pipe communicating with the tank main body is connected to the charging passage via a breather pipe and wherein a float valve adapted to close when the fuel level in the tank main body rises and when a vehicle rolls over is provided at a portion where the charging passage is connected to the tank main body, the fuel tank comprising, an overflow valve adapted to close by virtue of a buoyancy caused by fuel when the fuel level in the filler pipe rises, and a rollover valve adapted to close by virtue of the gravity thereof when a vehicle rolls over, the overflow valve and the rollover valve being provided along the breather pipe.

According to the above construction, since the overflow valve adapted to close by virtue of a buoyancy caused by fuel when the fuel level in the filler pipe rises is provided along the breather pipe connecting the upper space in the filler pipe to the canister via the charging passage, it is ensured by the closure of the overflow valve that fuel in the filler pipe is prevented from flowing into he canister through the breather pipe when fuel is supplied excessively. In addition, since the rollover valve is provided along the breather pipe which adapted to close when the vehicle rolls over, it is ensured by the closure of the rollover valve that fuel in the filler pipe is prevented from flowing into the canister through the breather pipe.

DETAILED DESCRIPTION OF THE PREFERRED EMBODIMENTS

A mode for carrying out the invention will be described below based on an embodiment shown in the accompanying drawings.

Figure 1:
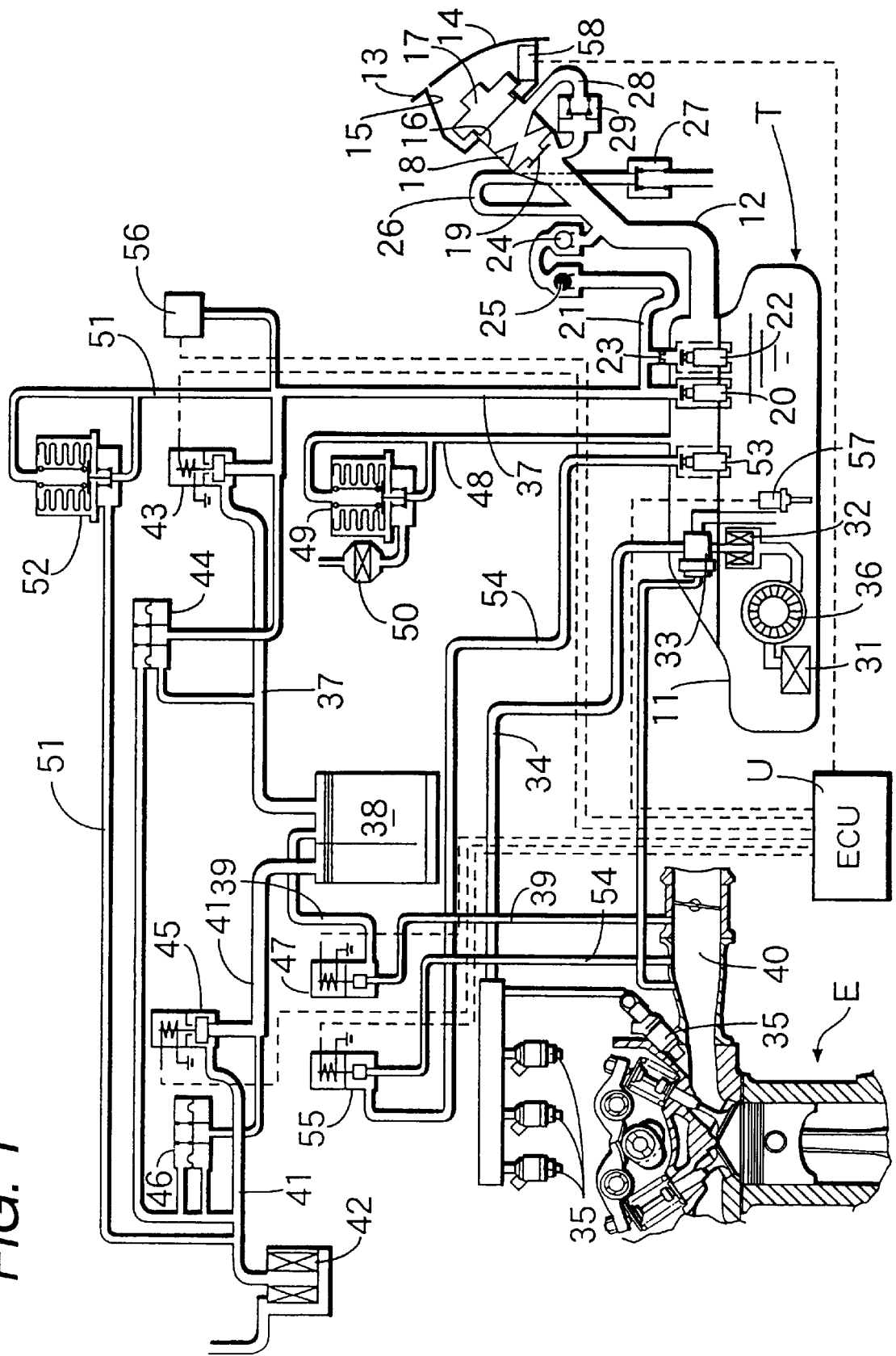
FIG. 1 is a diagram showing the overall construction of fuel supply system of an automobile.

As shown in FIG. 1, a fuel tank T of an automobile includes a tank main body 11 for storing fuel and a filler pie 12 for supplying fuel into the tank main body 11. A fuel entry port 16 which is connected to an upper end of the filler pipe 12 is provided in a recessed portion 15 formed in a body 13 of the automobile and adapted to be closed by a lid 14. An open end of the fuel entry port 16 can be closed by a filler cap 17, and there are provided between the fuel entry port 16 and the filler pipe 12, a seal member 18 into which a nozzle of a fuel filling gun G is hermetically inserted and a shutter 19 adapted to be opened when pushed by the nozzle.

Figure 2:
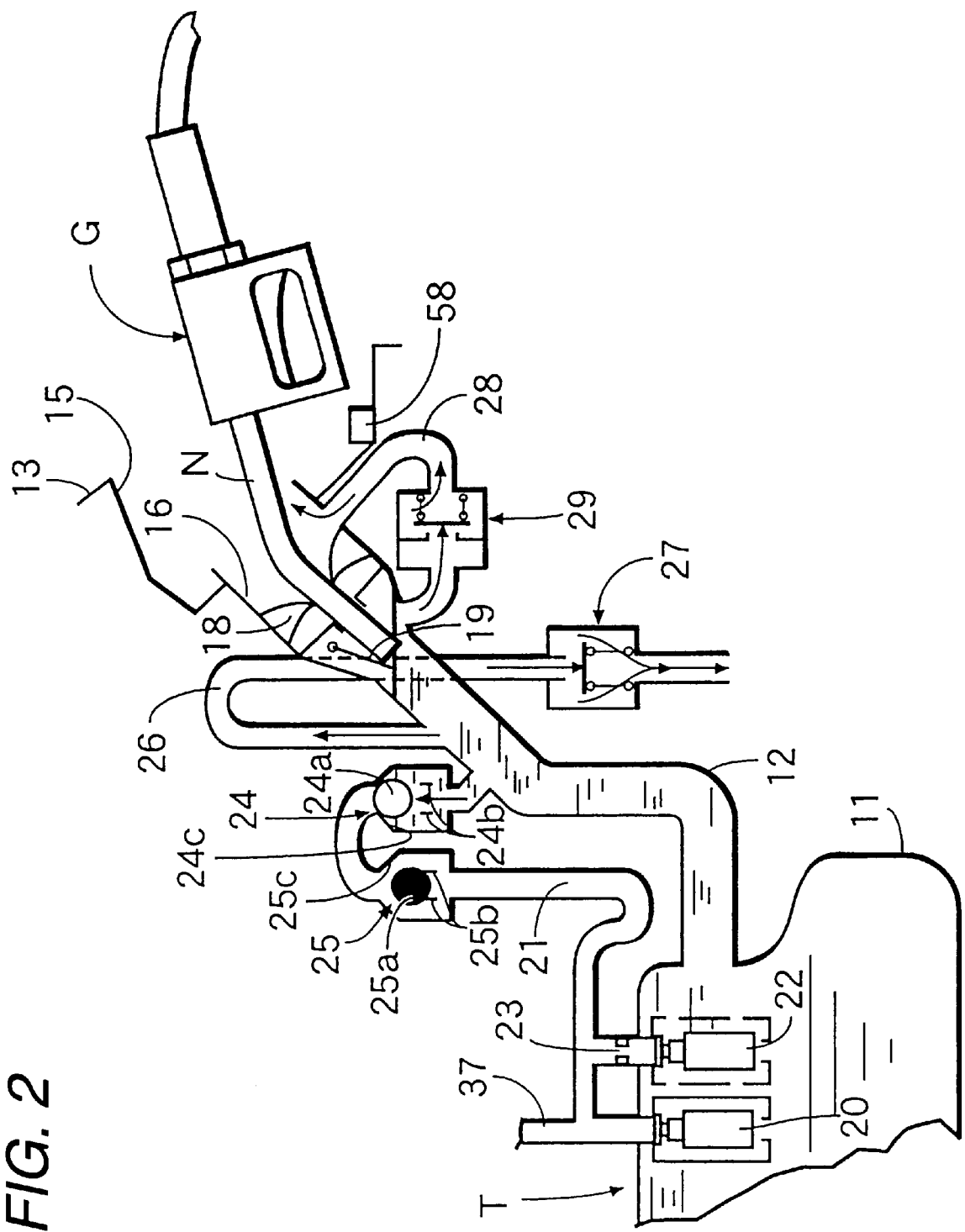
FIG. 2 is an enlarged view of a main part of FIG. 1 showing a condition when fueling is carried out.

As is clear when referring also to FIG. 2, an upper space of the tank main body 11 and an upper portion of the filler pipe 12 are connected to each other via a float valve 20 and a breather pipe 21, and the upper space of the tank main body 11 and the breather pipe 21 are connected to each other via float valve 22 and an orifice 23 which are provided for additional fueling.

An intermediate portion of the breather pipe 21 is curved into an inverted U-shape, and an overflow valve 24 and a rollover valve 25 are provided on both, sides of an apex of the curved intermediate portion. A valve body 24a of the overflow valve 24 is constituted by a float whose specific gravity is smaller than that of fuel, and therefore, when there exists no fuel within the breather pipe 21, the valve body 24a falls down due to the gravity and is supported on a valve body support portion 24b, while when there exists fuel within the breather pipe 21, the valve body 24 floats to be seated on a valve seat 24c to thereby close the breather pipe 21. A valve body 25a of the rollover valve 25 is constituted by a weight whose specific gravity is larger than that of fuel, and therefore whether fuel exists within the breather pipe 21, it normally falls downward due to the gravity thereof and is supported on a valve body support portion 25b, but when an automobile rolls over with the fuel tank being turned upside down, the valve body 25a falls down in a direction in which it separates from the valve body support portion 25b due to the gravity thereof until it is seated on a valve seat 25c, whereby the breather pipe 21 is closed (refer to FIG. 3C).

An end of a first relief passage 26 which is formed into an inverted U-shape is connected to an upper portion of the breather pipe 21, and the other end thereof opens to the atmosphere. Provided along the first relief passage 26 is a first relief valve 27 adapted to open when the internal pressure of the breather pipe. 21 exceeds a predetermined value. Additionally, the upper portion of the breather pipe 21 is connected to the fuel entry port 16 above the seal member 18 via a second relief passage 28, and provided along this second relief passage 28 is a second relief valve 29 adapted to open when the internal pressure within the breather pipe 21 exceeds a predetermined value. The valve opening pressure of the first relief valve 27 and that of the second relief valve 29 are set so as to be equal to each other, and the flow rate of the first relief valve when it opens is set so as to become far larger (for example, ten times larger) than that of the second relief valve 29.

A fuel pump 36 is provided inside the tank main body 11 for supplying fuel pumped up via a strainer 31 to fuel injection valves 35 via a filter 32, a regulator 33 and a feed pipe 34.

A canister 38 is connected to a charging passage 37 which branches off from the breather pipe 21 for adsorbing vaporized fuel generated within the tank main body 11. The canister 38 is then connected to an intake passage 40 of an engine E via purge passage 39 and is allowed to communicate with the atmosphere via an atmosphere communicating passage 41 and a filter 42. A first electromagnetic valve 43 is disposed along the charging passage 37, and a first positive pressure relief vale 44 is disposed in parallel with this first electromagnetic valve 43 such that the former bypasses the latter. Additionally, a second electromagnetic valve 45 is disposed along the atmosphere communicating passage 41, and a second positive pressure relief valve 46 is disposed in parallel with this second electromagnetic valve 45 such that the former bypasses the latter. Moreover, a third electromagnetic valve 47 is provided along the purge passage 39.

A first negative pressure relief valve 49 and a filter 50 are provided along a first negative pressure prevention passage 48 extending from the upper space of the tank main body 11, and a second negative pressure relief valve 52 is provided along a second negative pressure prevention passage 51 connecting the charging passage 37 and the filter 42. In addition, a fourth electromagnetic valve 55 is provided along a positive pressure prevention passage 54 connecting a float valve 53 provided within the upper space of the tank main body 11 with the intake passage 40 of the engine E.

An electronic control unit U controls the opening and/or closing of the first to fourth electromagnetic valves 43, 45, 47, 55 into which signals from a pressure sensor 56 for detecting the pressure of the charging channel 37, a fuel temperature sensor 57 for detecting the temperature of fuel present inside the fuel tank T and a lid opening and/or closing sensor 58 for detecting whether the lid is opened or closed.

Next, a description will be given below of operations of the embodiment according to the invention which is provided with the construction described above.

Firstly, a description will be given of an operation of the embodiment when no fueling is performed with the filler cap 17 of the filler pipe 12 of the fuel tank T being closed. Fuel stored inside the tank main body 11 is supplied to fuel injection valves 35 . . . , via the strainer 31, the fuel pump 36, the filter 32, the regulator 33 and the feed pipe 34, as the engine E runs. When the internal pressure of the tank main body 11 lowers in conjunction with the consumption of fuel or the reduction in temperature of the fuel tank T, bellows gets contracted due to the negative pressure generated within the tank main body 11, and the first negative pressure relief valve 49 opens, whereby atmospheric air is taken into the tank main body 11 via the filter 50 and the first negative pressure relief valve 49, thereby preventing the deformation of the tank main body 11 due to the negative pressure.

Note that the second negative pressure relief valve 52 is a spare part for the first negative pressure relief valve 49, and both function the same. Additionally, the float valve 20 and the additional fueling float valve 22 are both closed when the vehicle rolls over, whereby fuel within the tank main body 11 is prevented from flowing out into the canister 38.

When the internal pressure inside the tank main body 11 increases as the temperature of the fuel tank T increases while the engine E is stopped, since the first positive pressure relief valve 44 provided along the charging passage 37 and the second positive pressure relief valve 44 provided along the atmosphere communicating passage 41 are opened, the internal pressure inside the tank main body 11 is relieved to the atmosphere through the first positive pressure relief valve 44, the canister 38, the second positive pressure relief valve 46 and the filter 42, and when this takes place, fuel vapor emitted from the tank main body 11 are adsorbed by the canister 38, whereby the emission thereof to the atmosphere is prevented.

On the other hand, while the engine E is running, even if the temperature of the fuel tank T increases, when receiving signals from the pressure sensor 56 and the fuel temperature sensor 57, the electronic control unit U performs the duty control of the fourth electromagnetic valve 55 so as to open the same so that the internal pressure of the tank main body 11 is maintained equal to or below the atmospheric pressure. This allows the tank main body 11 to be connected to the intake passage 40 of the engine E via the positive pressure prevention passage 54, and the internal pressure of the main tank 11 can be maintained equal to or below the atmospheric pressure with a negative pressure present in the intake passage 40. Additionally, when the vehicle rolls over, the float valve 53 closes so that fuel remaining inside the tank main body 11 is prevented from flowing out into the intake passage 40 via the positive pressure prevention passage 54.

When purging vaporized fuel adsorbed to the canister 38, the second electromagnetic valve 45 provided along the atmosphere communicating passage 41 and the third electromagnetic valve 47 provided along the purge passage 39 are opened by a command from the electronic control unit U. As a result of this, atmospheric air is drawn into the intake passage 40 by virtue of a negative pressure in the intake passage 40 of the engine E via the filter 42, the second electromagnetic valve 45, the canister 38 and the third electromagnetic valve 47, and when this occurs, vaporized fuel adsorbed to the canister 38 is purged and supplied into the intake passage 40.

Next, an operation will be described when the fuel tank is being refueled. As shown in FIGS. 1 and 2, in a state in which the lid 14 is opened and the filler cap 17 is removed, the nozzle N of the fuel filling gun G is inserted into the seal member 18 at the fuel entry port 16 so that the tank main body 11 is refueled via the filler pipe 12. When this takes places, the lid opening and/or closing sensor 58 detecting that the lid 14 has been opened, the first electromagnetic valve 43 provided along the charging passage 37 and the second electromagnetic valve 45 provided along the atmosphere communicating passage 41 are opened by a command from the electronic control unit U, vaporized fuel forced out into the charging passage 37 in conjunction with the increase in fuel level in the tank main body 11 is adsorbed by the canister 38 after having passed through the first electromagnetic valve 43. Then, air having passed through the canister 38 which contains no fuel vapor is emitted to the atmosphere through the second electromagnetic valve 45 and the filter 42.

When the fuel level in the tank main body 11 is raised by the fueling to close the float valve 20, the fuel level in the filler pipe 12 is raised and the nozzle N of the fuel filling gun G submerges under the fuel level, whereby an automatic fill-stop device of the fuel filling gun G is actuated.

However, the additional fueling float valve 22 has not been closed yet in this stage, and the upper space of the tank main body 11 communicates with the breather pipe 21 via the orifice 23. Due to this, the fuel level in the tank main body 11 is slightly raised when air passes through the orifice 23, and in conjunction with this happening, the fuel level in the filler pipe 12 lowers slowly. Therefore, additional fueling can be effected from the fuel filling gun G by an amount corresponding to the amount in which the fuel level in the filler pipe 12 lowers, whereby fueling can securely be performed until the fuel tank is filled therewith while preventing the gushing back of fuel from the fuel entry port 16. Then, when the additional fueling float valve 22 is closed, the fuel level in the filler pipe 12 does not lower any further, by which the operator of the filling pump can confirm that the fuel tank has been filled with fuel.

Figure 3A:
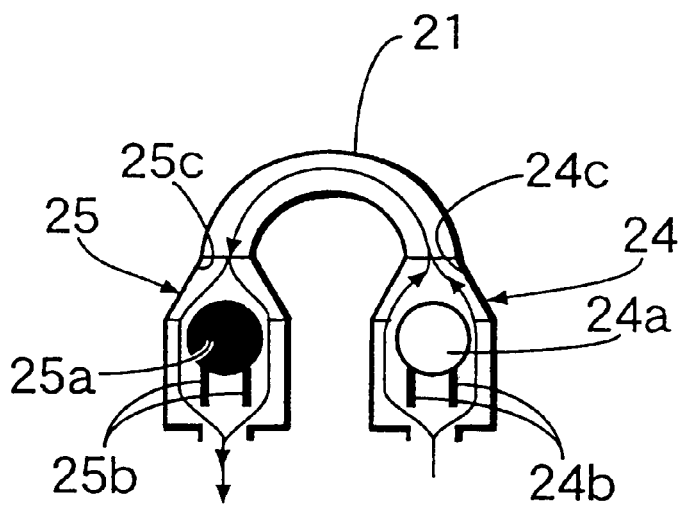
FIGS. 3A–3C are diagrams explaining the operation of an overflow valve and a rollover valve.
Figure 3B:
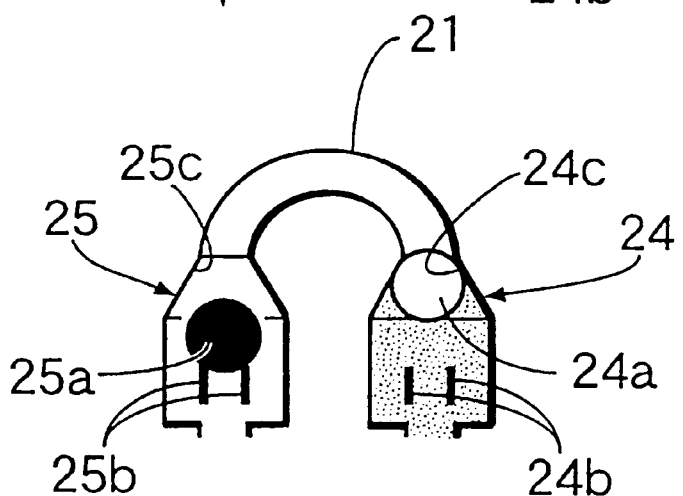

As shown in FIG. 3A, when the float valve 20 closes with the fuel level in the filler pipe 12 rising, since both the overflow valve 24 and the rollover valve 25 are open then, fuel vapor pushed out by fuel in the filler pipe 12 passes through the charging passage 37 from the breather pipe 21 for adsorption by the canister 38. Then, when the fuel level in the filler pipe 12 fully rises, as shown in FIG. 3B, the valve body 24a of the overflow valve 24 is pushed up by fuel to be seated on the valve seat 24c, whereby the breather pipe 21 is closed. Thus, even if fuel gushes back before and/or after the automatic fill-stop device of the fuel filling gun G is actuated, or excessive additional fueling takes place after the automatic fill-stop device is actuated, it is ensured that fuel is prevented from flowing into the canister 38 from the breather pipe 21 through the charging passage 37.

Figure 3C:
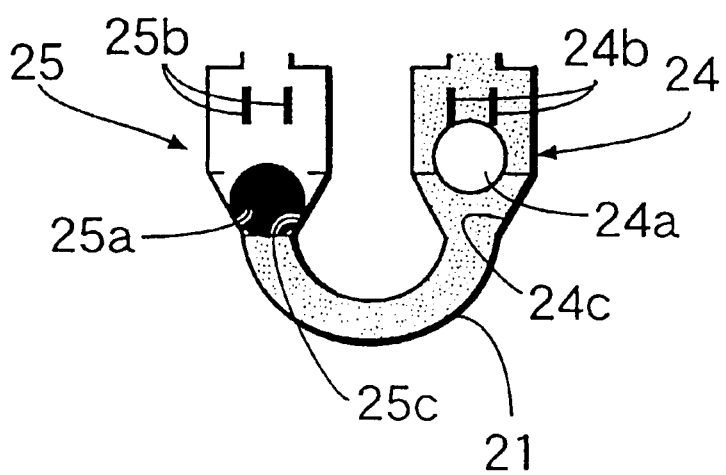

In addition, when the vehicle rolls over, as shown in FIG. 3C, since the valve body 25a of the rollover valve 25 whose specific gravity is larger than that of fuel is seated on the valve seat 25c by virtue of gravity to thereby close the breather pipe 21, it is ensured that fuel is prevented from flowing into the canister 38 from the breather pipe 21 through the charging passage 37.

On the other hand, when fuel continues to be supplied further even after the fuel tank becomes full due to the failure of the like of the automatic fill-stop device of the fuel filling gun G, the fuel level in the filler pipe 12 rises as high as an upper end of the filler pipe 12, drastically increasing the internal pressure, whereby the nozzle of the fuel filler gun G is pushed out of the seal member 18, this involving the possibility of fuel leakage. Additionally, since the internal pressures of the tank main body 11 and the filler pipe 12 built up, if a strength which is good enough to withstand the increased internal pressures is attempted to be imparted to the tank main body 11 and the filler pipe 12, it will cause a problem of increase in weight of the tank main body 11 and the filler pipe 12.

According to the invention, however, when the internal pressure of the filler pipe 12 builds up, since the first relief valve 27 opens to let out fuel in the filler pipe 12, it is possible to prevent not only the outflow of fuel that would be caused when the nozzle of the fuel filling gun G is pushed out from the seal member 18 but also the damage that would be caused to the tank main body 11 and/or the filler pipe 12 by virtue of the increased internal pressures. This can contribute to the reduction of the weight of the fuel tank T by lowering the strength of the fuel tank T required to withstand the increased internal pressure.

In addition, the second relief valve 29 opens as soon as the first relief valve 27 opens so as to allow a small amount of fuel to flow out from the filler pipe 12 into the fuel entry port 16 located above the seal member 18, and thus, it is ensured that the operator of the fuel filling pump can be informed of the occurrence of an abnormal situation so that he or she can be prompted to stop fueling.

Thus, while the embodiment of the invention has been described above, the invention is not limited thereto and may be modified in design variously without departing the sprit and scope of the invention.

For example, while the valve opening pressures of the first relief valve 27 and the second relief valve 29 are made identical with each other in the embodiment, they do not have to be made strictly identical. If the valve opening pressure of the second relief valve 29 is set lower than that of the first relief valve 27, the second relief valve 29 can be made to open so as to allow a small amount of fuel to flow out into the fuel entry port 16 located above the filler pipe to thereby inform the operator of the fuel filling pump of the occurrence of an abnormal situation before the first relief valve 27 opens to allow fuel to flow out from the filler pipe 12.

Further, while in the embodiment the overflow valve 14 is provided on the fuel entry port 16 side of the breather pipe 21 and the rollover valve 15 is provided on the float valve 20 side of the breather pipe 21, the positional relationship between the overflow valve 14 and the rollover valve 15 can be reversed.

As has been described above, according to the first aspect of the invention, since there is provided the first relief valve adapted to open when the internal pressure of the filler pipe reaches or exceeds the predetermined value due to excessive fueling so that the interior of the filler pipe can communicate with the atmosphere, it is possible to reduce the internal pressure of the filler pipe by allowing the first relief valve to open when fuel is supplied excessively. Thus, this can obviate the necessity to provide the tank main body and the filler pipe with a strength that is strong enough to withstand the excessively increased internal pressures and therefore contribute to the reduction of the weights of the tank main body and the filler pipe. Moreover, this construction can prevent the outflow of fuel that would happen when the nozzle of the fuel filling gun is dislocated from the seal member due to the aforesaid excessively increased internal pressure. Additionally, since the second relief valve opens so as to part of fuel in the filler pipe to flow out into the fuel entry port located above the seal member when excessive fueling takes place, the operator of the filling pump can be informed of the occurrence of an abnormal situation so as to prompt him or her to stop fueling.

Further, according to the second aspect of the invention, since the overflow valve adapted to close by virtue of a buoyancy caused by fuel when the fuel level in the filler pipe rises is provided along the breather pipe connecting the upper space in the filler pipe to the canister via the charging passage, it is ensured by the closure of the overflow valve that fuel in the filler pipe is prevented from flowing into the canister through the breather pipe when fuel is supplied excessively. In addition, since the rollover valve is provided along the breather pipe which is adapted to close when the vehicle rolls over, it is ensured by the closure of the rollover valve that fuel in the filler pipe is prevented from flowing into the canister through the breather pipe.

What is claimed is:

1. A fuel tank comprising:

a tank main body;

a filler pipe communicating with said tank main body, said filler pipe having a fuel entry port at an upper end thereof;

a seal member provided at said fuel entry port, for sealing an outer circumference of a nozzle of a fuel filling gun adapted to be inserted into said fuel entry port;

a first relief valve being opened to allow the interior of said filler pipe to communicate with the atmosphere, when the internal pressure of said filler pipe reaches or exceeds a first predetermined value; and a second relief valve being opened to allow the interior of said filler pipe to communicate with said fuel entry port located above said seal member, when the internal pressure of said filler pipe reaches or exceeds a second predetermined value.

2. The fuel tank according to claim 1, wherein said first and second predetermined values are set to be substantially equal to each other.

3. The fuel tank according to claim 1, wherein said second predetermined value is set to be lower than said first predetermined value.

4. The fuel tank according to claim 1, wherein the flow rate of said first relief valve is set to become larger than that of said second relief valve, when said first and second relief valves are opened.

5. A fuel tank comprising:

a tank main body;

a filler pipe communicating with said tank main body;

a charging passage connecting an upper space of said tank main body to a canister;

a float valve provided at a portion where said charging passage is connected to said tank main body, said float valve being closed when the fuel level in said tank main body rises or when a vehicle rolls over; and a breather pipe connecting an upper space of said filler pipe to said charging passage, said breather pipe comprising:

an overflow valve being closed by virtue of a buoyancy caused by fuel when the fuel level in said filler pipe rises, and a rollover valve being closed by virtue of the gravity thereof when the vehicle rolls over.

6. The fuel tank according to claim 5, wherein said breather pipe has an intermediate portion curved in an inverted U-shape so as to open downwardly, and said overflow valve and said rollover valve are respectively disposed on both sides of said inverted U-shaped intermediate portion with respect to an apex thereof.

7. The fuel tank according to claim 5, wherein said float valve is disposed on the interior of said tank main body.

8. The fuel tank according to claim 5, further comprising:

an additional float valve disposed on the interior of said tank main body and communicating with said breather pipe; and an orifice disposed on a communicating passage between said additional float valve and said breather pipe.

9. The fuel tank according to claim 5, further comprising:

said filler pipe having a fuel entry port at an upper end thereof;

a seal member located at a fuel entry port provided at an upper end of said filler pipe, for sealing an outer circumference of a nozzle of a fuel filling gun adapted to be inserted into said fuel entry port;

a first relief valve being opened to allow the interior of said filler pipe to communicate with the atmosphere, when the internal pressure of said filler pipe reaches or exceeds a first predetermined value; and a second relief valve being opened to allow the interior of said filler pipe to communicate with said fuel entry port located above said seal member, when the internal pressure of said filler pipe reaches or exceeds a second predetermined value.

* * * * *